US006786692B2

(12) United States Patent
Manini

(10) Patent No.: US 6,786,692 B2
(45) Date of Patent: Sep. 7, 2004

(54) METHOD AND APPARATUS FOR AUTOMATIC PICK UP OF HOSIERY ARTICLES FROM A CONTAINER

(75) Inventor: Benito Manini, Florence (IT)

(73) Assignee: Santoni S.p.A., Brescia (IT)

( * ) Notice: Subject to any disclaimer, the term of this patent is extended or adjusted under 35 U.S.C. 154(b) by 0 days.

(21) Appl. No.: 10/104,754

(22) Filed: Mar. 21, 2002

(65) Prior Publication Data

US 2002/0150451 A1 Oct. 17, 2002

(30) Foreign Application Priority Data

Mar. 21, 2001 (IT) ..................................... PI2001A0022

(51) Int. Cl.⁷ .............................. B65G 47/00; B25J 3/00
(52) U.S. Cl. ........................... 414/13; 414/811; 901/35; 294/907
(58) Field of Search ......................... 414/416.01, 422, 414/618, 13; 901/35; 294/907, 64

(56) References Cited

U.S. PATENT DOCUMENTS

| | | | | |
|---|---|---|---|---|
| 3,970,201 A | * | 7/1976 | Keene | 414/416.01 |
| 4,266,905 A | * | 5/1981 | Birk et al. | 414/627 |
| 4,501,529 A | * | 2/1985 | Wiebesiek | 414/751 |
| 4,533,167 A | * | 8/1985 | Johnson | 294/86.4 |
| 4,561,825 A | * | 12/1985 | Sakata | 414/753 |
| 4,599,036 A | * | 7/1986 | Tarbuck | 414/730 |
| 4,600,357 A | * | 7/1986 | Coules | 414/730 |
| 4,730,861 A | * | 3/1988 | Spencer | 294/86.4 |
| 4,911,490 A | * | 3/1990 | Akagawa | 294/88 |
| 4,955,656 A | * | 9/1990 | Krogstup et al. | 294/100 |
| 5,012,591 A | * | 5/1991 | Asakawa | 901/41 |
| 5,308,132 A | * | 5/1994 | Kirby et al. | 294/64.1 |
| 5,961,168 A | * | 10/1999 | Kanno | 294/64.1 |
| 6,082,946 A | * | 7/2000 | Jensen | 414/13 |
| 6,287,066 B1 | * | 9/2001 | Heinz et al. | 414/13 |
| 6,457,759 B1 | * | 10/2002 | Unokuchi | 294/64.1 |

* cited by examiner

Primary Examiner—Douglas Hess
(74) Attorney, Agent, or Firm—The Bilicki Law Firm, P.C.

(57) ABSTRACT

A method and apparatus for automatically picking up hosiery articles (20) from a container (7), e.g., socks, knee socks, and the like in which an actuator (4) comprised of a support (5), to which a grasping device (6) is suspended, picks up the hosiery articles (20) at a loading position and moves them to an unloading position. The grasping device (6) is lowered into the container until the grasping device (6) contacts the free surface of the bulk of hosiery articles (20). The actuator (4) continues to be lowered according to a brief additional stroke and the grasping device (6) delays the closure even after a first contact with the free surface of hosiery articles (20). The grasping device (6) is then detected and closed onto hosiery articles (20) grasping at least one of them. The grasping device (6) them moves to the unloading position by means of the actuator (4) where the grasping device (6) opens and releases the hosiery article (20). Finally, grasping device (6) is returned to the starting position above the container (7) for a next picking up step.

15 Claims, 6 Drawing Sheets

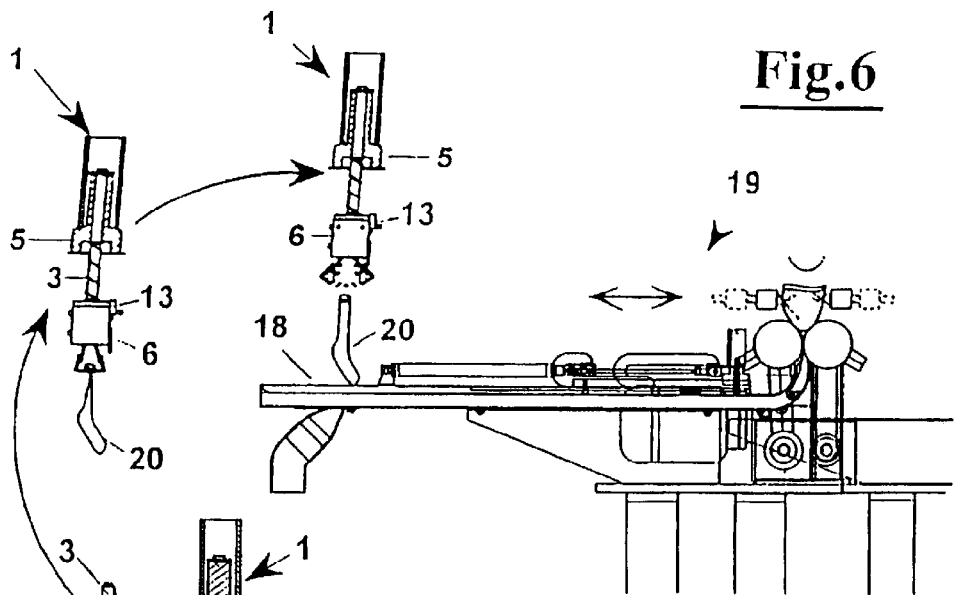
Fig.6
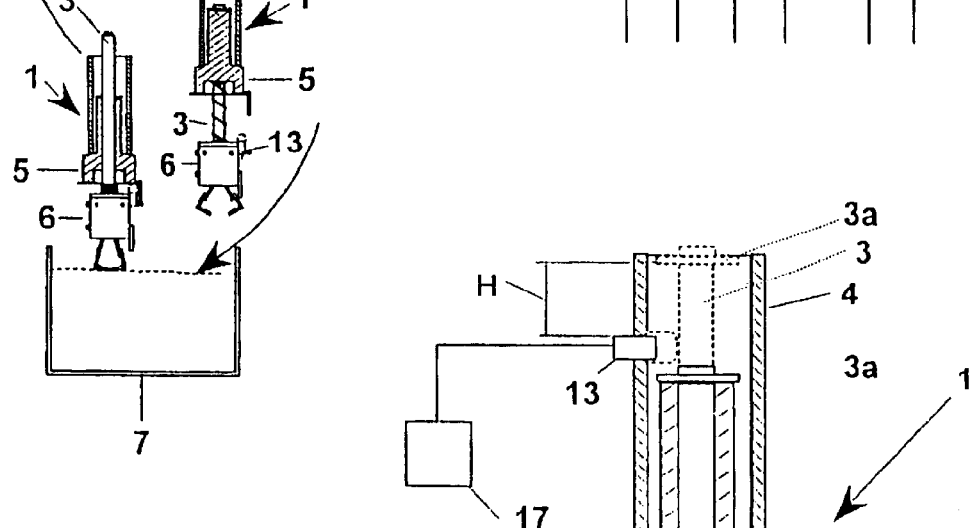
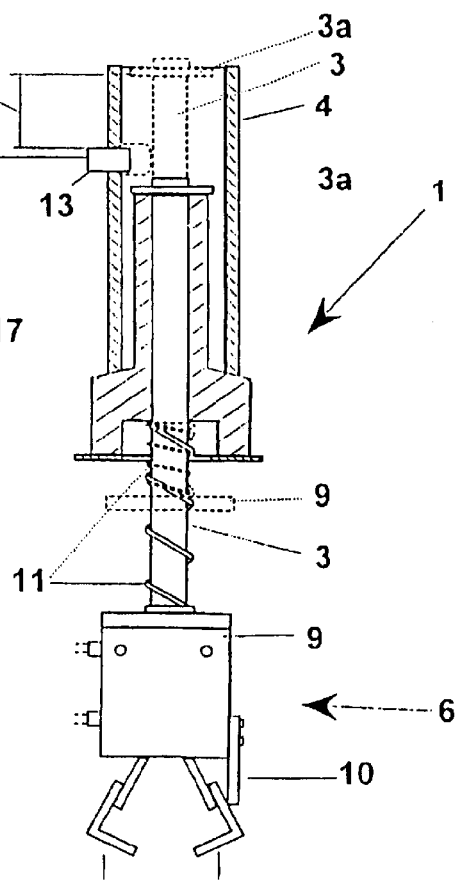
Fig.7

METHOD AND APPARATUS FOR AUTOMATIC PICK UP OF HOSIERY ARTICLES FROM A CONTAINER

FIELD OF INVENTION

The present invention refers to a method for automatically picking up hosiery articles from a container, in species socks, knee socks, and the like, made of knitted sponge-like cotton, wool, cotton, or synthetic fibres, and for their subsequent loading on automatic finishing lines. Furthermore the invention relates to a device that carries out this method.

BACKGROUND OF THE INVENTION

In the following description, reference is made to a non-limiting example of socks. However, it should be understood that the same method can be extended to knee socks and other hosiery articles.

In an automatic production cycle, before a hosiery article reaches the final packaging step, it must follow a path with various working steps.

Usually, starting from a step of automatic or manual pick up of the hosiery article from a special container, the sock passes through intermediate steps that provide seaming, and/or steaming, up to the final packaging.

Presently, hosiery articles are picked from special containers manually. Techniques also exist of automatic pick up by means of a feeding sucker that holds the hosiery articles raising them from a special container. This technique, however, is applicable only for veiled articles such as collants, knee socks, and stockings, which are made of thin knitted veil and are very flexible.

On the other hand, the same feeding sucker system does not allow an automatic pick up from a container of other hosiery articles, made of synthetic fibres, but with thicker knitting, as well as in sponge-like cotton, wool, or thick cotton. For such articles, only manual loading systems are presently known.

SUMMARY OF THE INVENTION

It is therefore an object of the present invention to provide a method for automatically picking up hosiery articles from a container, in particular socks, knee socks, and the like, knitted of spongy and/or wool material, which overcomes the drawback of the existing techniques.

It is, furthermore, an object of the invention to provide a device that carries out this method.

The pick up method according to the invention provides the use of a grasping device moving from a starting position. The free end of the grasping device, comprising, in one embodiment, grasping jaws, gradually approaches the bulk of hosiery articles gathered in a container. The grasping device is suspended from an end of an actuator, but is not integral to the actuator so that as soon as the jaws of the grasping device contacts the free surface of the bulk of hosiery articles, the actuator continues for a brief additional stroke. In particular, the additional stroke causes the grasping device to contact the hosiery articles without stopping the lowering of the grasping device even after a first contact with the free surface of the bulk of the hosiery articles.

The end of the brief additional stroke, i.e. when the actuator has approached the grasping device, or the beginning of the additional stroke, i.e. when the actuator starts the approaching movement to the grasping device, are detected automatically and it indicates with certainty that the grasping device has met the bulk of hosiery articles in the container. At this point, when it is detected that the support is close to the grasping device, or after having detected the beginning of the approaching movement of the support to the grasping device, the jaws are closed automatically, grasping at least one hosiery article. Then, the whole device, by means of the actuator, is moved from the pick up position to an unloading position. In the unloading position, the jaws release the hosiery article(s) on a loading plane of a finishing machine. Then, the whole device returns to the starting position above the container for another picking up step.

According to another aspect of the invention, a device for automatically picking up one or more hosiery articles from a container comprises:

- support integral to the movable part of an actuator;
- a grasping device having grasping means;
- a sliding guide of said grasping device with respect to said support, wherein said grasping device Is suspended from said support at a predetermined distance from it and can be pushed to approach said support;
- proximity sensor means, of the approached position reached by said grasping device with respect to said support;
- means for blocking said grasping means responsive to said proximity sensor means, at said approached position.

In one embodiment, the sensor means is comprised of one or more proximity sensors integral to the support that detects the vicinity of the grasping device within a predetermined range. In this case, advantageously, a mechanical pawl is provided that prevents the grasping device from contacting the sensors integral to the actuator.

Alternatively, the sensor means is comprised of proximity sensors integral to the support that detect the passage of the sliding guide with respect to the support. In this case, the contact of the grasping device with the hosiery articles is detected and the device stops the grasping device as it approaches the actuator and is properly positioned relative to the hosiery articles.

In particular, the signals coming from the sensor means cause the closure of the jaws for grasping the hosiery articles. The following opening movement of the jaws is operated by the control unit at the unloading station where the hosiery article is released.

In one embodiment, the grasping means is comprised of a pair of jaws operated by pneumatic means and a control unit which operates the pneumatic means in response to signals coming from the sensor means.

In an alternate embodiment, the grasping device provides a opening adjustment device of the jaws that allows for the adjustment of the maximum opening of the jaws with respect to a longitudinal axis of the device for picking up only one hosiery article at a time.

BRIEF DESCRIPTION OF THE DRAWINGS

Further characteristics of the method and of the device according to the present invention for automatically picking up hosiery articles will be made clear with the following description of an embodiment thereof, exemplifying but not limiting, with reference to the attached drawings, wherein:

FIG. 6, shows the succession of steps of FIGS. 1 through 5;

FIG. 7 shows an alternate embodiment of the device of FIG. 1 in which the sensor means are alternately positioned.

DESCRIPTION OF EMBODIMENTS OF THE INVENTION

Figure 1:
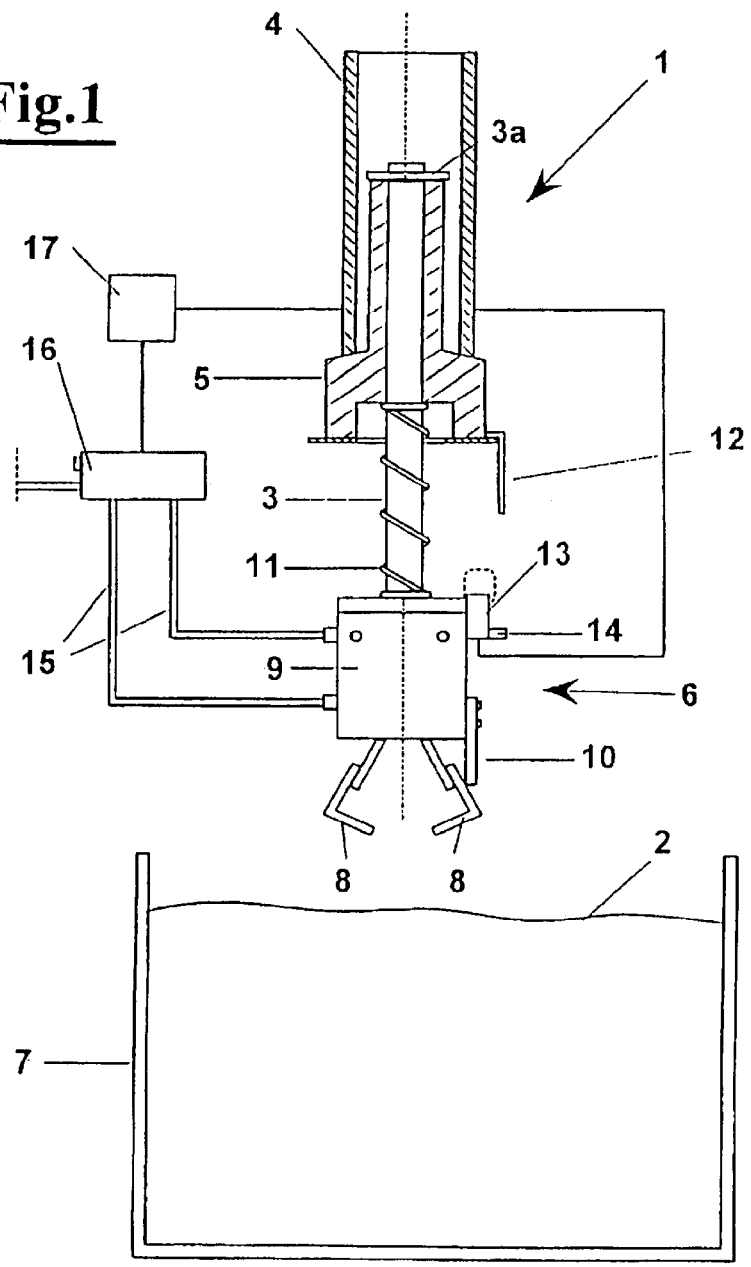
FIG. 1 shows an elevational view of a device for automatically picking up a hosiery article from a container.

With reference to FIG. 1, for an automatic pick up of a hosiery article (not shown) from container 7, device 1 is comprised of stem 4 of an actuator (i.e., a carrier), for example an articulated arm, having at the distal end support 5 to which grasping device 6 is suspended. More precisely, guiding rod 3 is provided, on which grasping device 6 slides with respect to support 5, whereby grasping device 6 is normally suspended from support 5 spaced at a maximum distance corresponding to the length of guiding rod 3, and can be pushed upwardly from below to approach support 5, against spring 11. Grasping device 6 is comprised of, in this embodiment, two jaws 8 and body 9 that contains pneumatic parts that operate jaws 8, with air supplied through air ducts 15 by double-acting valve 16, and operated by control unit 17. Control unit 17 receives signals from proximity sensor 13 integral to grasping device 6 and oriented towards the above, in order to determine the presence of support 5 within a predetermined range. One of ordinary skill in the art will recognize that proximity sensor 13 may also be mounted on support 5 for detecting the presence of grasping device 6 below. Furthermore, proximity sensor 13 may be mounted in the position of FIG. 7 described hereinafter.

Referring again to FIG. 1, stem 4 is positioned with grasping device 6 above container 7 with the hosiery articles that reach level 2. At first, jaws 8 of grasping device 6 are in an open position and are suspended from support 5 by means of guiding rod 3, which is comprised of flange 3a at the free end. The maximum opening of jaws 8 is set manually by adjusting device 10.

Figure 2:
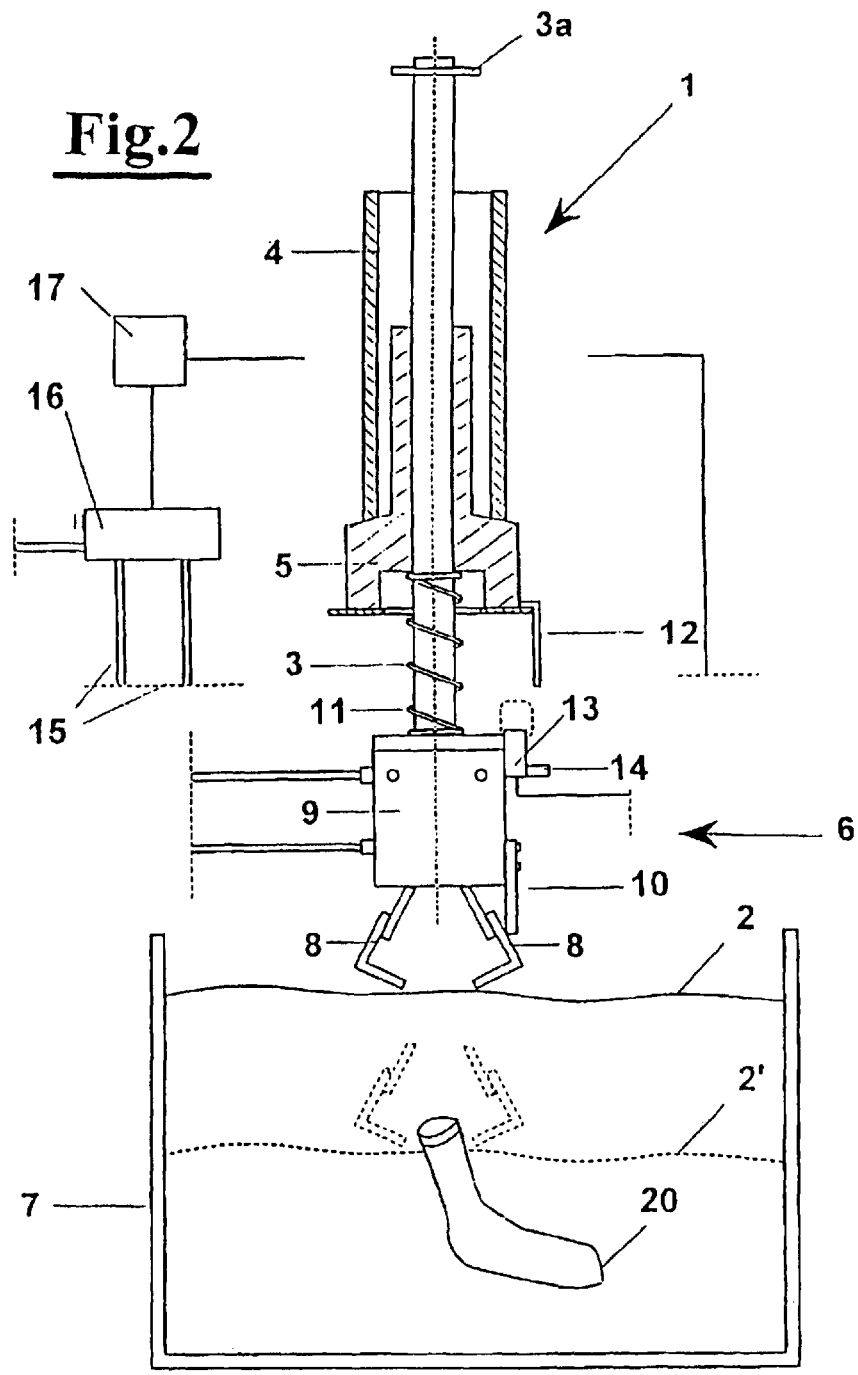
FIGS. 2 through 5 show a diagrammatical view following positions of the device of FIG. 1, in which a hosiery article is grasped and loaded on to a conveyor belt.

As shown in FIG. 2, there is the first contact of grasping device 6 with hosiery articles 20. In this position jaws 8 could already grasp hosiery articles 20. However, since level 2 is variable and might for example be in the position 2', the exact level of first contact cannot be foreseen.

Therefore, according to the invention, the downward movement of grasping device 6 continues and the movement of grasping device 6 stops smoothly on the surface of hosiery articles 20, wherever it is, without momentarily affecting this movement. After the first contact of grasping device 6 with hosiery article 20, a short downward movement with respect to support 5 starts, owing to the downward push of stem 4 even after the first contact of jaws 8 with hosiery articles 20. More precisely, support 5 tends to further compress spring 11 beyond the point at which jaws 8 first contact the upper surface of hosiery articles 20 in container 7 In order to extend grasping device 6 deeper into container 7.

Figure 3:
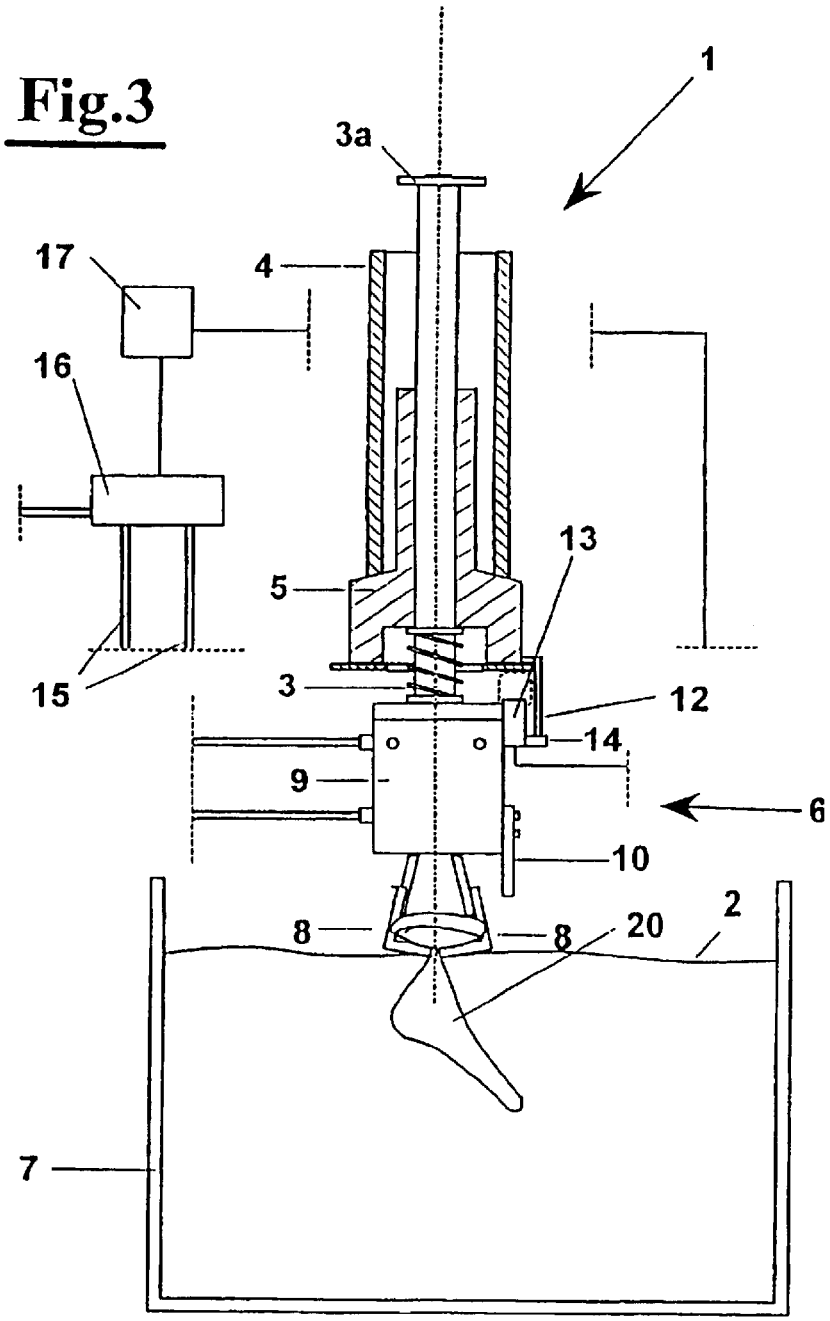

As shown by FIG. 3, the lowering of support 5 continues until it is detected by proximity sensor 13. Pawl 12 is provided that prevents support 5 and grasping device 6 from contacting each other. In fact, abutment 14 limits the movement of support 5 towards grasping device 6 by contacting pawl 12.

At the detection of the presence of support 5, control unit 17 opens valve 16 and, through one of ducts 15, it operates the closure of jaws 8. In other words, as clearly visible in FIG. 3, when grasping device 6 pushes with jaws 8 onto hosiery articles 20, sensor 13 detects the presence of support 5, whereby through body 9, jaws 8 are closed in order to grasp hosiery article 20.

Figure 4:
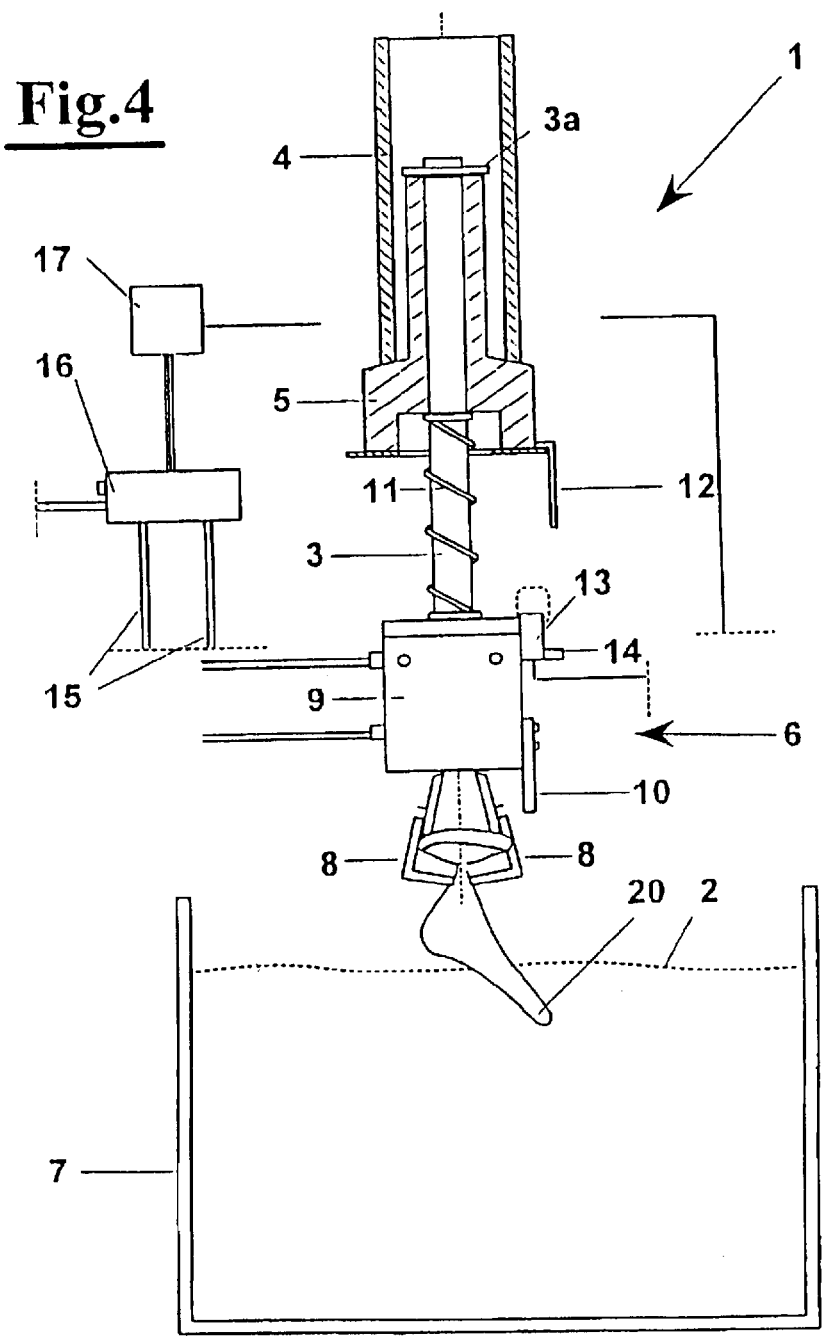

As shown in FIG. 4, after grasping hosiery article 20, spring 11 is released, thus spacing support 5 from grasping device 6. Grasping device 6 is again suspended by means of guiding rod 3 to support 5 and can be raised together with hosiery article 20 from container 7. Jaws 8 continue to remain closed even if sensor 13 is spaced from support 5.

Figure 5:
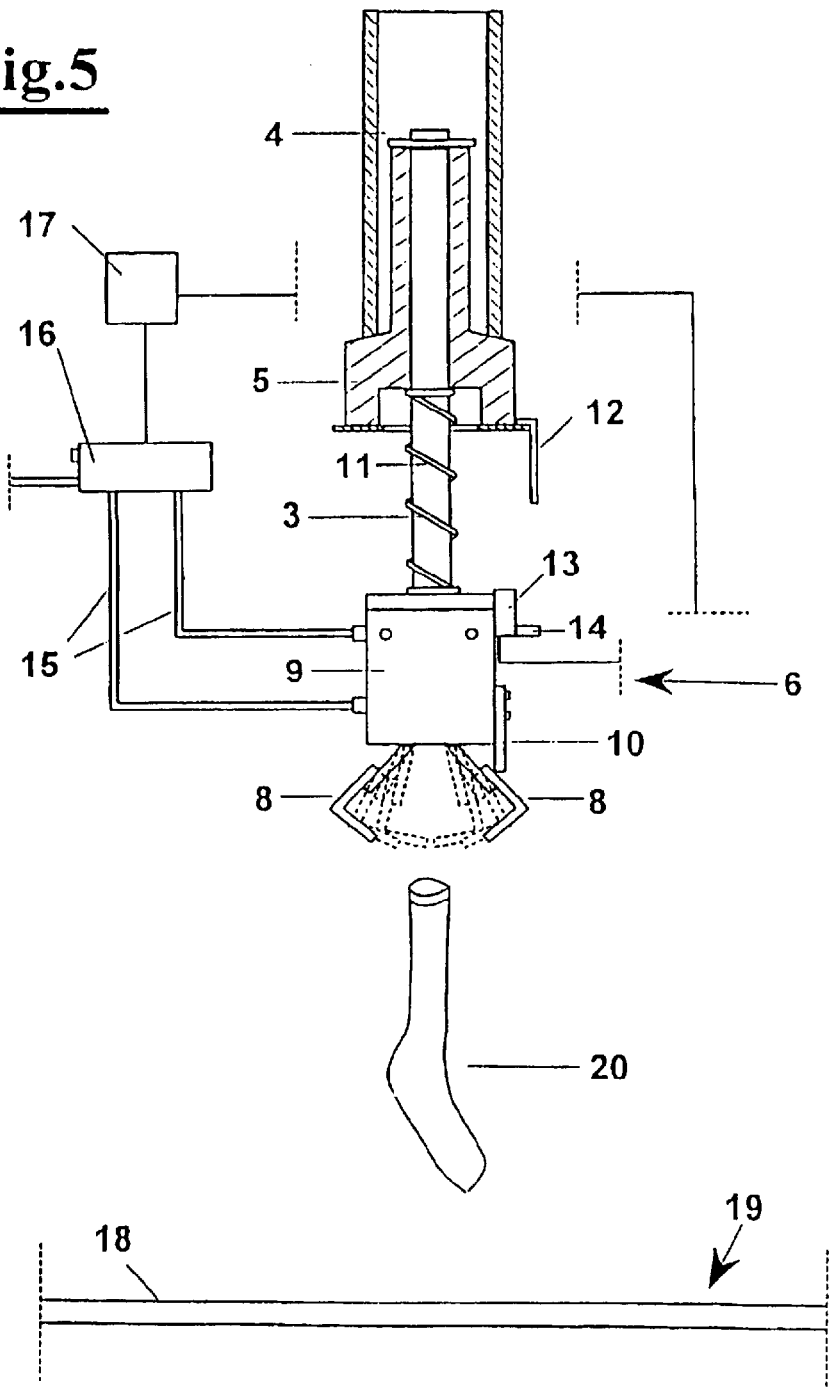

As shown in FIG. 5, device 1 with hosiery article 20 is moved to an unloading position where jaws 8 are opened by control unit 17. Hosiery article 20 is then unloaded, for example, on conveyor belt 18 of finishing line 19, for the successive steps of the production cycle. In FIG. 6, all of the steps above described are shown. The steps of moving grasping device 6 from the loading position to the unloading position (and vice-versa), can be effected in any known way, as known to those of ordinary skill in the art. One example is the use of an articulated arm, as provided supra.

Notwithstanding reference having been made to the detection of the position of contact of jaws 8 with hosiery articles 20 by means of proximate sensor 13 mounted on grasping device 6, it is not excluded that sensor 13 is mounted in a way other than that shown in the above figures, for example on support 5. In particular, as shown in FIG. 7, proximate sensor 13 can be mounted in order to detect the movement of flange 3a. This way, the signal of achievement by grasping device 6 of hosiery article 20 at level 2 within container 7, transmitted to the microprocessor through the bus that connects to proximate sensor 13, can start in advance of grasping device 6 approaching support 5. In this case, there is the advantage that the stop of the actuator 4 can be carried out after an additional path H, before which grasping device 6 ends the sliding stroke, owing to a delay between the signal of the processor 17 and the actual stop. This avoids the problem of grasping device 6 breaking as a result of hitting against the bottom of container 7 if level 2 of hosiery articles 20 within container 7 is close to the bottom.

The foregoing description of a specific embodiment will so fully reveal the invention according to the conceptual point of view, that others, by applying current knowledge, will be able to modify and/or adapt for various applications such an embodiment without further research and without parting from the invention, and it is therefore to be understood that such adaptations and modifications will have to be considered as equivalent to the specific embodiment. The means and the materials to realize the different functions described herein could have a different nature without, for this reason, departing from the field of the invention. It is to be understood that the phraseology or terminology employed herein is for the purpose of description and not of limitation.

What is claimed is:

1. A method for automatically picking up at least one hosiery article from a container, comprising the steps of:

a handling by means of an actuator, a grasping device starting from an initial position, said grasping device being suspended to a support integral to said actuator at a predetermined distance from said actuator and can be pushed to approach said support;

moving said actuator, and said grasping device to said actuator, suspended, above a container containing said at least one hosiery article;

lowering said actuator and the grasping device to said actuator suspended integrally to each other until said grasping device contacts a free surface of said at least one hosiery article, said actuator continuing to be lowered according to a brief additional stroke, said grasping device delaying closure even after a first contact with said free surface of said at least one hosiery article, at the end of said additional stroke said support being approached to said grasping device;

detecting the presence of said support as said grasping device approaches said support and subsequent closure of said grasping device onto said at least one hosiery article, grasping at least one of said at least one hosiery article;

moving said grasping device by means of said actuator from a pick up position to an unloading station where said grasping device opens and releases said at least one hosiery article on a loading plane of a finishing machine;

moving said grasping device back to a starting position above said container for a next picking up step.

2. The method of claim 1, wherein said hosiery articles are made of a thick knitted material and selected from a group comprised of socks and knee socks.

3. The method of claim 1, wherein said means for blocking said grasping means comprises a pneumatic means operated by a control electronic unit for operating said pneumatic means responsive to signals coming from said proximity sensor means.

4. The method of claim 1, wherein said proximity sensor means is comprised of one or more sensors that detect the vicinity of said at least one grasping device to said support within a predetermined range.

5. The method of claim 4, further comprised of a mechanical pawl, wherein a said mechanical pawl prevents said at least one grasping device and said support from contacting directly.

6. The method of claim 1, wherein said proximity sensor means comprises at least one proximity sensor that detects passage of said sliding guide with respect to said support, whereby when said at least one grasping device contacts said at least one hosiery article, said at least one grasping device is stopped from approaching said actuator.

7. The method of claim 1, wherein said at least one grasping device further includes adjusting means that adjusts a maximum opening for picking up one of said at least one hosiery article at a time.

8. The method of claim 1, wherein said at least one grasping means is comprised of a pair of jaws.

9. A device for automatically picking up at least one hosiery article from a container comprised of:

a support integral to a movable part of an actuator;

at least one grasping device having grasping means comprised of a pair of reciprocating jaws;

a sliding guide of said grasping device with respect to said support, wherein said at least one grasping device is suspended from said support at a predetermined distance from said support and capable of being pushed to approach said support:

proximity sensor means, which detect the approaching of said at least one grasping device to said support;

means for blocking said grasping means responsive to said proximity sensor means.

10. The device according to claim 9, wherein said means for blocking said grasping means comprises a pneumatic means operated by a control electronic unit for operating said pneumatic means responsive to signals coming from said proximity sensor means.

11. The device according to claim 9, wherein said proximity sensor means is comprised of one or more sensors that detect the vicinity of said at least one grasping device to said support within a predetermined range.

12. The device according to claim 11, further comprised of a mechanical pawl, wherein said mechanical pawl prevents said at least one grasping device and said support from contacting directly.

13. The device according to claim 9, wherein said proximity sensor means comprises at least one proximity sensor that detects passage of said sliding guide with respect to said support, whereby when said at least one grasping device contacts said at least one hosiery article, said at least one grasping device is stopped from approaching said actuator.

14. The device according to claim 9, wherein said at least one grasping device further includes adjusting means that adjusts a maximum opening for picking up one of said at least one hosiery article at a time.

15. The device of claim 9, wherein said hosiery articles are made of a thick knitted material and selected from a group comprised of socks and knee socks.

* * * * *